US009632500B2

(12) United States Patent
Nyström et al.

(10) Patent No.: US 9,632,500 B2
(45) Date of Patent: Apr. 25, 2017

(54) METHOD AND ARRANGEMENT FOR CONFIGURING A SYSTEM FOR MONITORING THE PERFORMANCE OF A CONTROL LOOP OF AN INDUSTRIAL PLANT

(71) Applicant: ABB TECHNOLOGY AG, Zürich (CH)

(72) Inventors: Rasmus Nyström, Heidelberg (DE); Manfred Rode, Wiesloch (DE)

(73) Assignee: ABB Schweiz AG, Baben (CH)

( * ) Notice: Subject to any disclaimer, the term of this patent is extended or adjusted under 35 U.S.C. 154(b) by 547 days.

(21) Appl. No.: 14/278,718

(22) Filed: May 15, 2014

(65) Prior Publication Data

US 2014/0249655 A1 Sep. 4, 2014

Related U.S. Application Data

(63) Continuation of application No. PCT/EP2011/070475, filed on Nov. 18, 2011.

(51) Int. Cl.
*G05B 23/00* (2006.01)
*G05B 23/02* (2006.01)

(52) U.S. Cl.
CPC ..... *G05B 23/0264* (2013.01); *G05B 23/0297* (2013.01)

(58) Field of Classification Search
CPC combination set(s) only.
See application file for complete search history.

(56) References Cited

U.S. PATENT DOCUMENTS

| | | | |
|---|---|---|---|
| 6,799,143 | B1 | 9/2004 | Frerichs et al. |
| 2004/0215353 | A1 | 10/2004 | Frerichs et al. |
| 2007/0005311 | A1 | 1/2007 | Wegerich et al. |
| 2007/0078533 | A1 | 4/2007 | Caldwell et al. |
| 2007/0142936 | A1 | 6/2007 | Denison et al. |
| 2008/0082312 | A1 | 4/2008 | Dash et al. |
| 2009/0062932 | A1 | 3/2009 | Caldwell et al. |

(Continued)

OTHER PUBLICATIONS

International Preliminary Report on Patentability for PCT/EP2011/070475, Form PCT/IPEA/409 dated Jan. 2014.*

(Continued)

*Primary Examiner* — Huan Tran
(74) *Attorney, Agent, or Firm* — Barnes & Thornburg LLP

(57) ABSTRACT

Exemplary embodiments for configuring a system for monitoring the performance of a control loop of an industrial plant includes reading in first process data derived from measurements of at least one sensor inside the control loop during a specified control situation, calculating from the first process data a corresponding at least one performance index indicating the behaviour of the control loop and determining a first quality of the control performance depending on the difference between the at least one performance index and a corresponding threshold value. In case that the first quality of the control performance is determined to be less than good, a second quality of the control performance is determined either by calculating the second quality from an analysis of second process data or by processing a user input from a user of the system which indicates the second quality.

20 Claims, 6 Drawing Sheets

Control loop without backlash

Set point (--) and Process variable (— )

54.4
[%]
54
53.6
0 0.2 0.4 0.6 0.8

Manipulated variable

50
[%]
46
42
0 0.2 0.4 0.6 0.8

Time [h]

(56) References Cited

U.S. PATENT DOCUMENTS

2010/0228363 A1 9/2010 Denison et al.

OTHER PUBLICATIONS

Written Opinion of the International Searching Authority, Form PCT/ISA/237 for PCT/EP2011/070475.*

Jelali, "An overview of control performance assessment technology and industrial applications," Control Engineering Practice, Science Direct, 2006, pp. 441-446, vol. 14, Elsevier Ltd.

Bonavita, et al., "Control loops: performance and diagnostics," ABB Process Solutions & Services SpA, 48th ANIPLA Conference, Sep. 2004, pp. 1-15, Milan.

International Search Report (PCT/ISA/210) mailed on Dec. 29, 2011, by the European Patent Office as the International Searching Authority for International Application No. PCT/EP2011/070475.

* cited by examiner

METHOD AND ARRANGEMENT FOR CONFIGURING A SYSTEM FOR MONITORING THE PERFORMANCE OF A CONTROL LOOP OF AN INDUSTRIAL PLANT

RELATED APPLICATION(S)

This application claims priority as a continuation application under 35 U.S.C. §120 to PCT/EP2011/070475 filed as an International Application on Nov. 18, 2011 designating the U.S., the entire content of which is hereby incorporated by reference in its entirety.

FIELD

The disclosure relates to a method and an arrangement for configuring a system for monitoring the performance of a control loop of an industrial plant.

BACKGROUND INFORMATION

The performance monitoring of control loops is used in industrial plants, after the control loops have been configured and set into operation, and it is a means to detect any malfunctioning of the elements and components inside the control loop based on normal operational data of the control loop. In other words, performance monitoring is an online or offline diagnosis of the quality of control loop operation. As a result of the performance monitoring, it can be ensured that the sensors, actuators and the industrial processing devices which control the operation of the actuators based on the measurements taken by the sensors, as well as any networking components which interconnect the sensors, actuators and industrial processing devices are all working properly.

In general, performance monitoring is performed by surveying different kinds of statistics which reflect the control performance over time and by detecting any abnormalities in these statistics. An introduction into the field of control performance monitoring is for example given in a document by Mohieddine Jelali, "An overview of control performance assessment technology and industrial applications", Control Engineering Practice 14 (2006), pp. 441-466.

ABB markets a known software package under the name Loop Performance Manager (LPM). It provides a solution for the optimisation and maintenance of basic control loops of industrial plants and includes a tool for the automatic evaluation of the performance of the control loops, called loop auditing. The basic concepts behind the loop auditing tool are described for example in Bonavita et al, "Control loops: performance and diagnostics", presented at 48$^{th}$ ANIPLA Conference, Milan, 14-15, Sep. 2004.

When the performance of a control loop is being evaluated using statistical methods, as is for example done in the loop auditing tool of LPM, there is normally no mathematical model available of the process being controlled, and the disturbances acting on the process are unknown. Therefore, it is attempted to estimate the performance of the control loop by assuming that the control loop possesses properties that are characteristic to the control loop type in question, for example pressure control, temperature control, etc. Accordingly, LPM permits the grouping of control loops into categories. Thereby, the following characteristics of the control loop are predefined: the representative time constants of the process controlled by the control loop category (e.g., type) in question, the representative disturbances, and, based on the previous, the representative response of the control loop. Based on these characteristics, the sampling frequency and the number and length of data batches, e.g., of periodical process data to be captured, are predefined as well.

Depending on the type of control loop to be monitored, the loop auditing tool of LPM performs the specified number of collections of process data at predefined times, while operating in background so that the normal control loop operation remains undisturbed. From the collected process data, the programme calculates different performance indices, also called key performance indices (KPI), some of which are calculated in continuous mode for each newly taken data sample and most of which are calculated in batches, e.g., at the end of the data collection.

The control loop categories are characterized by threshold values, which are defined for the different statistical and other performance indices. In order to generate clear diagnostic suggestions with respect to the performance of the control loop, the performance indices are each compared to its corresponding threshold value. Based on the result of each individual comparison, a value indicating the quality of the control performance with respect to the specific performance index is calculated, where these values are called sub-qualities. Since the performance indices stand for different aspects of the behaviour of the control loop, their corresponding threshold values need to be chosen individually in order to take into account that some indices reflect an improved control performance by having an increased value and some reflect an improved control performance by having a decreased value. By selecting the type of control loop in question out of the above mentioned predefined fixed set of control loop types, an adjustment of the threshold values up to a certain degree is performed.

From the sub-qualities, an overall quality value for the control performance of the control loop in question is derived by weighing each sub-quality and by calculating the sum of the weighted sub-qualities. The overall quality, in the following also called first quality, of the control performance is then expressed by translating the quality value into one of four self-explaining performance categories: excellent, good, fair or poor.

Even though selecting the control loop type works sufficiently well in a majority of cases, situations may occur where a control loop is diagnosed as poor or, more generally, as less than good, despite having selected the correct control type and having configured and tuned the control loop properly. This condition is due to uncommon background conditions which are not reflected in the assumed disturbances and the assumed representative behaviour of the control loop. For example, the industrial plant may be subject to a continual disturbance, to which the control loop is able to react so that the disturbance does not affect the operation of the industrial plant. However, the continual disturbance may superimpose some of the measured process data which influences the outcome of the performance diagnosis. An erroneous result of the control performance monitoring may have unwanted and negative impacts, such as the distraction of a user which supervises the operation of the industrial plant from correct and important error and alarm messages. Further, false alarms could cause extra costs due to fruitless assignments of service and maintenance personnel.

SUMMARY

A exemplary method for configuring a system for monitoring the performance of a control loop of an industrial plant is disclosed, comprising: reading in first process data derived from measurements of at least one sensor inside the control loop during a particular control situation; calculating from the first process data at least one performance index indicating the behaviour of the control loop; performing a first determination by determining a first quality of the control performance depending on a difference between the at least one performance index and a corresponding threshold value, wherein if under the first determination the first quality of the control performance is determined to be less than good, a second quality of the control performance is determined by analyzing second process data derived in a different way from measurements of the at least one sensor or of at least one further sensor inside the control loop during the particular control situation, or by processing an input from a user, the input indicating the second quality, wherein if the second quality is determined to be less than good, the first quality is identified as a correct value, wherein if the second quality of the control performance is determined to be good or better than good the at least one threshold value is adjusted to have a value close to the at least one performance index, and a second determination of the first quality is performed with an expectation that the first quality has a same level as the second quality, wherein if under the second determination, the first quality is determined to be good or better than good, as expected, the at least one threshold value is stored for a next control performance diagnosis, and wherein if under the second determination the first quality is still determined to be less than good, an error message is generated.

An exemplary arrangement for configuring a system for monitoring the performance of a control loop of an industrial plant is disclosed, comprising: a data reading unit configured to read in first process data derived from measurements of at least one sensor inside the control loop during a control situation; a performance evaluation unit configured to calculate from the first process data a corresponding at least one performance index indicating the behaviour of the control loop and perform a first determination of a first quality of a control performance depending on a difference between the at least one performance index and a corresponding threshold value; a confirmation unit configured to determine a second quality of the control performance, if the first quality of the control performance is determined to be less than good, by calculating the second quality from an analysis of second process data derived from measurements of at least one further sensor inside the control loop during the control situation, or by processing an input from a user of the system which indicates the second quality; an adaptation unit configured to confirm and correct the first quality if the second quality is less than good, or adjust the at least one threshold value to have a value close to the at least one performance index, if the second quality of the control performance is determined to be good or better than good, perform a second determination of the first quality with an expectation that under the second determination the first quality has a same level as the second quality, if under the second determination the first quality is determined to be good or better than good, as expected, the at least one threshold value is stored for a next control performance diagnosis, and if under the second determination the first quality is still less than good, generate an error message; and a data storage unit configured to store the at least one adjusted threshold value if under the second determination the first quality is determined to be good or better than good.

BRIEF DESCRIPTION OF THE DRAWINGS

The disclosure and its exemplary embodiments will become apparent from the example and its exemplary embodiments described below in connection with the appended drawings which illustrate.

DETAILED DESCRIPTION

Figure 1:
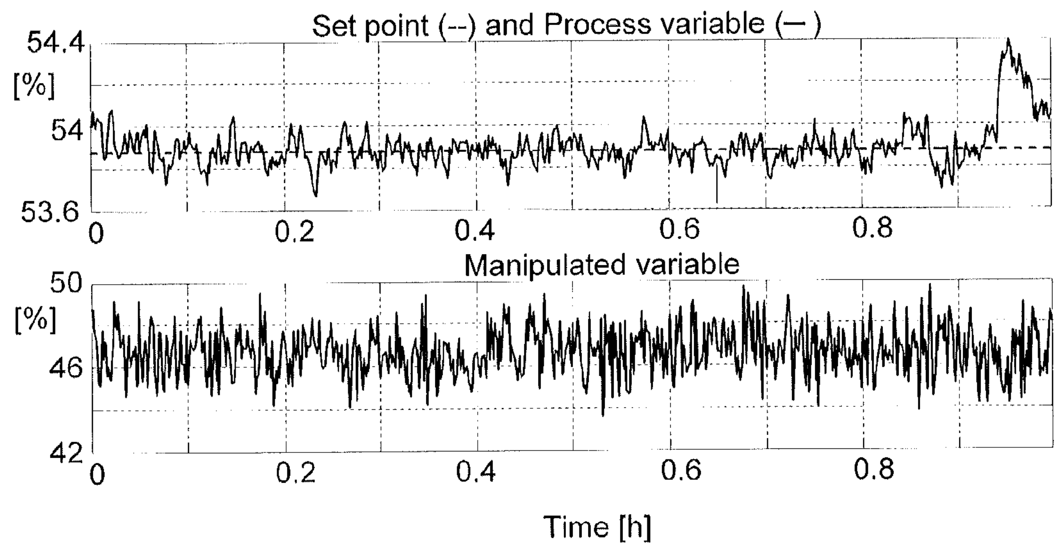
FIG. 1 illustrates a diagram of a data batch for a control loop without backlash according to an exemplary embodiment of the disclosure.

Exemplary embodiments of the present disclosure provide a method and an arrangement for configuring a system for monitoring the performance of a control loop of an industrial plant with which the above described drawback of predefined control loop types is overcome.

According to an exemplary embodiment the disclosure, the method disclosed herein includes reading in process data derived from measurements of at least one sensor inside the control loop during a particular control situation, calculating from the process data a corresponding at least one performance index indicating the behaviour of the control loop, determining a quality value of the control performance depending on the difference between the at least one performance index and a corresponding threshold value, determining a second quality of the control performance, in case that the first quality of the control performance is determined to be less than good, where the second quality is determined either by calculating the second quality of the control performance from an analysis of second process data derived in a different way from measurements of the at least one sensor or of at least one further sensor inside the control loop during the same particular control situation, or by processing an input from a user of the system which indicates the second quality. If this second quality of the control performance is determined to be good or better, the at least one threshold value is adjusted to have a value close to the at least one performance index.

In other words, in cases where a control loop is diagnosed to perform poorly it is first determined whether there exists a discrepancy between this result of the normal control performance monitoring and a second diagnostic result, where the second diagnostic result is generated either from an analysis of second process data which are derived in a way which differs from the first process data or from a user input. The user input may for example be a simple click on a button indicating that the current process data are regarded to belong to an excellent (e.g., more than satisfactory) control performance. If this button is not pressed, then no adjustment of threshold values is required by the user. Alternatively, the user may differentiate the control performance, for example by stating expressly whether the control performance is regarded to be excellent, good (e.g., satisfactory), fair or poor (e.g., less than satisfactory).

If the two quality values differ significantly, e.g., if the automatically or user generated second quality value indicates a good or even excellent control performance while the first quality was determined to be less than good, the first process data are defined to become process data representing good or even excellent control performance. Accordingly, it is assumed that the threshold value which defines a good or excellent control performance, respectively, is approximately equal to the at least one performance index derived from the first process data. The at least one performance index becomes a reference performance index, and the corresponding threshold value is adjusted accordingly and afterwards stored permanently.

In this way, an individual setting of the threshold values for the particular control loop which is being diagnosed, is derived and stored so that later diagnostic sessions for this control loop provide more realistic results. Consequently, the disclosure provides a method, and an arrangement to perform the method, to automatically adapt the threshold values to given references, where up to now the threshold values have been fixed values. Due to the disclosure, the variability of the control loop types can be accounted for.

It is further suggested to store the adjusted threshold values together with the unchanged parameters of the control loop type which corresponds to the particular control loop as a parameter set for a new sub-class belonging to the control loop type. In other words, if a specified behaviour of the control loop can be seen as a general feature of control loops of the same sub-type, the threshold values resulting from the adaptation can be seen as sub-classes of the fixed loop types. For example, the temperature control of a combustion chamber in a boiler and the temperature control of a super heater both belong to the class or type of temperature control loops. Practice has shown that one fixed set of threshold values may not suffice to cover both of these sub-classes.

The analysis of the second process data for deriving the second quality value can for example be performed equivalently to the analysis of the first process data, e.g., by calculating a second value for the at least one performance index from the second process data and by determining the second quality of the control performance depending on the difference between the at least one further performance index and a corresponding further threshold value. Alternatively, the second process data can be used to calculate a different type of performance index which is either directly translated into the second quality or compared with a corresponding further threshold value in order to generate the second quality value from the resulting difference.

According to a specific exemplary embodiment of the disclosure, the at least one threshold value is adjusted to have a value which differs by a predefined percentage from the at least one performance index, where the predefined percentage has a first value for the cases where the second quality is good and at least one further value for the cases where the second quality is better than good. In other words, the predefined percentage reflects how closely the threshold value is set to the reference performance index in order to indicate the different categories of satisfying control performance. Different percentages are chosen for different control performance categories, also taking into account whether the reference performance index itself stems from a control loop with good control behaviour or better. In case of a reference performance index from an excellently (e.g., more than satisfactory, better than good) working control loop, the first value of percentage for good control performance could for example be set to plus or minus 20% and a second value could be set to plus or minus 10% for excellent control performance. Whether the percentage has a positive or negative value depends on whether an increase in the performance index shows an improving or degrading control performance. Apart from just having two acceptable performance categories, there could be defined more, such as good enough, good, very good and excellent. Accordingly, the same number of percentages would have to be defined with respect to the allowed deviation from the reference performance index.

In an exemplary embodiment of the disclosure, more than just one performance index can be determined, where each performance index has its own corresponding threshold value. For each of these performance indices and their corresponding threshold values a corresponding sub-quality is determined. The first quality of the control performance is then determined as a sum of weighted sub-qualities. Again, in case that the first quality of the control performance is determined to be less than good but the second quality is determined to be good or better, a re-adjustment is performed. Since the overall first quality is less than good, at least one of the sub-qualities has to be less than good, as well; otherwise the overall first quality would be better. In this exemplary embodiment, the weight of at least one of those sub-qualities which were determined to be less than good is reduced or set to zero.

This exemplary embodiment is designed to suppress the influence of erroneous sub-qualities, e.g., of sub-qualities which do not properly reflect overall good control performance. The suppressing of an erroneous sub-quality can be performed either without adjusting the threshold value corresponding to the sub-quality or after the corresponding threshold value has been adjusted and if the sub-quality afterwards still has a value which does not reflect the value of the second quality, e.g., if it is still less than good, for example poor or fair. The amended or changed weights can be permanently stored, for example, together with any adjusted threshold values.

Given this configuration, not only threshold values but also weights can be adjusted automatically and individually for each control loop, so that specialities and deviations from the predefined control loop types are better taken into account at later control performance diagnostic sessions.

In order to ensure that the resulting overall first quality calculated with amended weights is still comparable to earlier determined values of the first quality; it is suggested to compensate for the reduction of weights. This can be done for example by increasing the weight of at least one of those sub-qualities which were determined to be good or better so that the overall sum of all weights remains unchanged. In case that the first quality of the control performance is determined as a scaled sum of weighted sub-qualities, it is advantageous if the scaling factor is proportional to the overall sum of all weights, so that the compensation becomes inherent to the scaling.

There may also exist control situations where certain performance indices and their resulting sub-qualities are not applicable, e.g., where by nature they result in a poor or only fair sub-quality even though the overall control performance is good or better. This is for example the case where oscillating control behaviour is not due to a deteriorated controller performance but due to characteristics of the controlled elements in the industrial plant, such as friction or backlash in mechanically moving devices. In order to take such control situations into account. According to another exemplary embodiment of the disclosed herein the weight of the at least one sub-quality can be reduced after having evaluated that the at least one sub-quality is not applicable to the specified control situation. The reduction of the weight is made such that the corresponding sub-quality no longer reflects (e.g., appears) in the overall control performance. In yet another exemplary embodiment of the present disclosure, the weight can be reduced to a small value or set to zero.

In still another exemplary embodiment, the at least one threshold value can be adjusted to have a value so close to the at least one performance index and/or the weight of many sub-qualities is modified so that the resulting first quality of the control performance is determined to be good or better, respectively. Accordingly, the adjusting of threshold values based on one or more reference performance indices and/or the suppressing of erroneous sub-qualities is performed in an iterative way, until the first quality of the control performance reaches the desired quality level or category.

FIG. 1 illustrates a diagram of a data batch for a control loop without backlash according to an exemplary embodiment of the disclosure. The diagram of FIG. 1 shows the time dependent behaviour of a data batch belonging to a control loop of an industrial plant. The diagram is divided into two horizontal parts. The upper part shows how a process variable, depicted as solid line, jitters around a set point, which is depicted as a straight dotted line, and the lower part shows a manipulated variable, also called actuating variable, corresponding to the upper part, e.g., the lower part shows the behaviour of an input variable to an actuator which affects the control loop, where the resulting activities of the actuator lead to the behaviour of the process variable seen in the upper part of the diagram. All data shown in the diagram can be regarded as process data since they are derived directly or through data processing from measurements taken by sensors inside the control loop.

The overall control performance of the control loop of FIG. 1 is regarded to be excellent. This is also recognized by a system for monitoring the performance of the control loop, where the output of this system is written in the upper part of the diagram.

Figure 2:
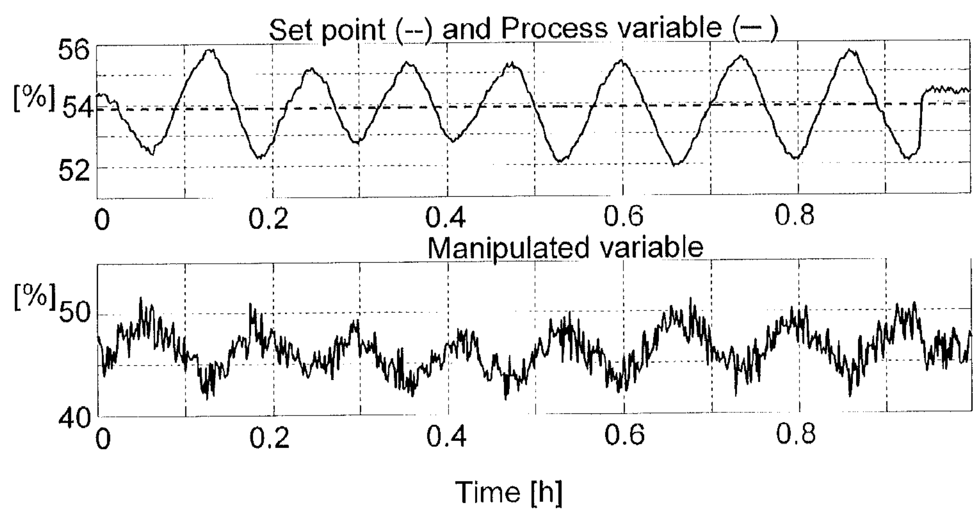
FIG. 2 illustrates a diagram of a data batch for a control loop with backlash according to an exemplary embodiment of the disclosure.

FIG. 2 illustrates a diagram of a data batch for a control loop with backlash according to an exemplary embodiment of the disclosure. As shown in FIG. 2, the same kind of data of a data batch belonging to the same kind of control loop of the same kind of industrial plant, where the only difference lies in that this control loop contains a mechanical element having a backlash, e.g., showing a loose motion between mechanically contacting parts when the direction of motion is reversed. The backlash becomes clearly visible in the process variable as well as the manipulated variable, shown in the upper and the lower part of the diagram, respectively. The process variable oscillates considerably around the set point, so that the control error oscillates as well. The control performance of the control loop is diagnosed to be poor. However, due to the backlash it is not possible to improve the control performance any further, why it is decided in this example to accept the performance as it is. Accordingly, the result of the control performance diagnosis is regarded to be wrong with respect to the specific circumstances, e.g., with respect to the inevitable backlash.

Such a wrong diagnosis would lead to false and therefore undesired error or even alarm messages which could distract a user supervising the operation of the industrial plant in an unnecessary way from the real and important error and alarm messages. Further, such false alarms could cause extra costs due to fruitless assignments of service and maintenance personnel.

According to an exemplary embodiment of the present the reliability of the system for control performance monitoring can be increased in the manner suggested above. In the following, three exemplary methods based on the disclosure are described.

Figure 3:
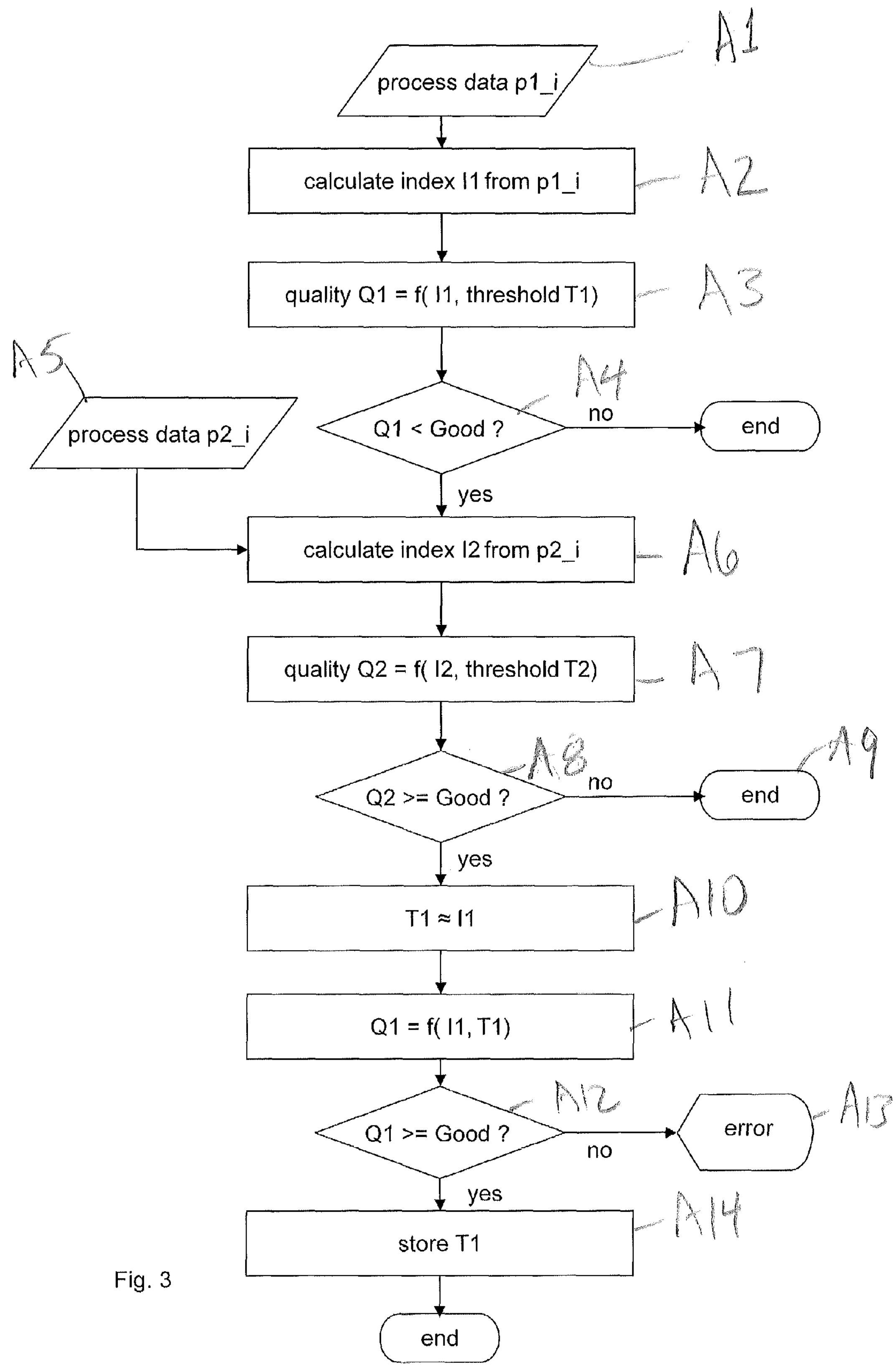
FIG. 3 illustrates a flow chart of a first monitoring process according to an exemplary embodiment of the disclosure.

FIG. 3 illustrates a flow chart of a first monitoring process according to an exemplary embodiment of the disclosure. In a first step, a number i of first process data p1_*i* are read in (A1), either from a data storage unit or directly as measurements from a sensor of the control loop or from a processing unit which continuously processes the measurements from the sensor and generates process data based on these measurements. The number i of the process data depends on the period of time for which the data are to be read in and on the sampling frequency. From the first process data p1_*i,* a first performance index I1 is calculated (A2).

The process data can for example belong to a process variable which is to be controlled, e.g., a controlled process variable. The set point for this process variable can be read in as additional process data or it can be available to the arrangement for performing the method in the form of a configuration variable. From the controlled process variable, the following two example performance indices can be calculated. On one hand, the number of times per unit time where the controlled process variable crosses the set point can be determined. The larger the value of this performance index, the better the control performance is regarded since it indicates that the control loop is "active" enough. On the other hand, the quadratic sum of the control error, e.g., of the difference between the set point and the controlled process variable, can be calculated. Here, it is better if this performance index has a lower value, since it shows that the controlled process is kept as closely as possible to the set point.

From the first performance index I1, a first quality Q1 is calculated, as a function of the first performance index I1 and of a first threshold value T1 (A3). This function depends on the type of the performance index. For the first of the two examples mentioned above, the first quality Q1 could for example be determined from the difference between the number of crossings of the set point, e.g., between the first performance index I1, and the first threshold value T1, where the first threshold value is set to a value which is regarded to reflect an excellent control performance (A4). If the number of crossings is larger than the threshold, the first quality Q1 is set to a value corresponding to excellent (e.g., more than satisfactory or better than good). If the number of crossings is smaller than the threshold, it depends on how much smaller it is. For example, it could be defined that if the number of crossing is not more than 10% below the threshold, the first quality Q1 is set to a value corresponding to good, if it is not more than 20% below the threshold then the first quality Q1 is set to fair, and everything below the 20% is set to poor. In an alternative solution, the first threshold value T1 could also be set to a value which reflects a good control performance, instead of an excellent one. In that case, all performance indices passing the threshold indicate satisfactory control behaviour and all performance indices falling below the threshold stand for non-satisfactory control behaviour. The further a performance index lies above the threshold the better the control performance, and the further it falls below the threshold the poorer the control performance.

For the example of the quadratic sum of control errors as first performance index I1, the differentiation between the categories of control performance—excellent, good, fair and poor—would be done just in the opposite direction, e.g., the threshold for an excellent first quality Q1 would be set to a comparatively low value and everything above would be regarded to be less than excellent, where the highest first performance index I1 would result in the poorest first quality Q1.

If the first quality Q1 is determined to be less than good, a number i of second process data p2_*i* is read in (A5), where the second process data are derived in a different way as the first process data p1_*i,* e.g., by processing the measurements of the same sensor in a different way or by taking or processing measurements of another sensor of the same control loop. From the second process data p2_*i,* a second performance index I2 (A6) and a second quality Q2 (A7) are calculated in the same way as described above, taking into account a second threshold value T2.

If the second quality Q2 is also less than good, the first quality Q1 is regarded to be confirmed and correct and the method ends (A8, A9). If, on the other hand, the second quality Q2 stands in contrast to the first quality Q1 by being good or better, for example good or excellent, this is taken as a proof for the incorrectness of the value for the first quality Q1. In order to reflect the real high quality of control performance, the first performance index I1 is regarded to be a reference for a good performance index, if the second quality Q2 is good, or even for a better performance index, if the second quality Q2 is better. In the exemplary embodiment of FIG. 3 it is assumed that the second quality Q2 is excellent and that the first threshold value T1 stands for excellent control performance (A9, A10). Since the currently calculated first performance index I1 is now a reference for this excellent quality of control performance, the first threshold T1 is set to a value which is approximately equal to the first performance index I1, differing from it only by a small percentage, for example between 0% and 10%, in order to take into account an estimated variation of the performance index for excellent control behaviour.

In the next step, the first quality Q1 is calculated again (A11), where it is now expected that the first quality should have the same level as the second quality Q2 (A12). If the first quality Q1 is better than good, as expected, the adjusted first threshold value T1 is stored permanently in order to be available for the next time the control performance diagnosis is performed (A14). Then the method ends successfully.

If in the alternative the first quality Q1 is still less than good, the method ends with an appropriate error message (A13).

Figure 4:
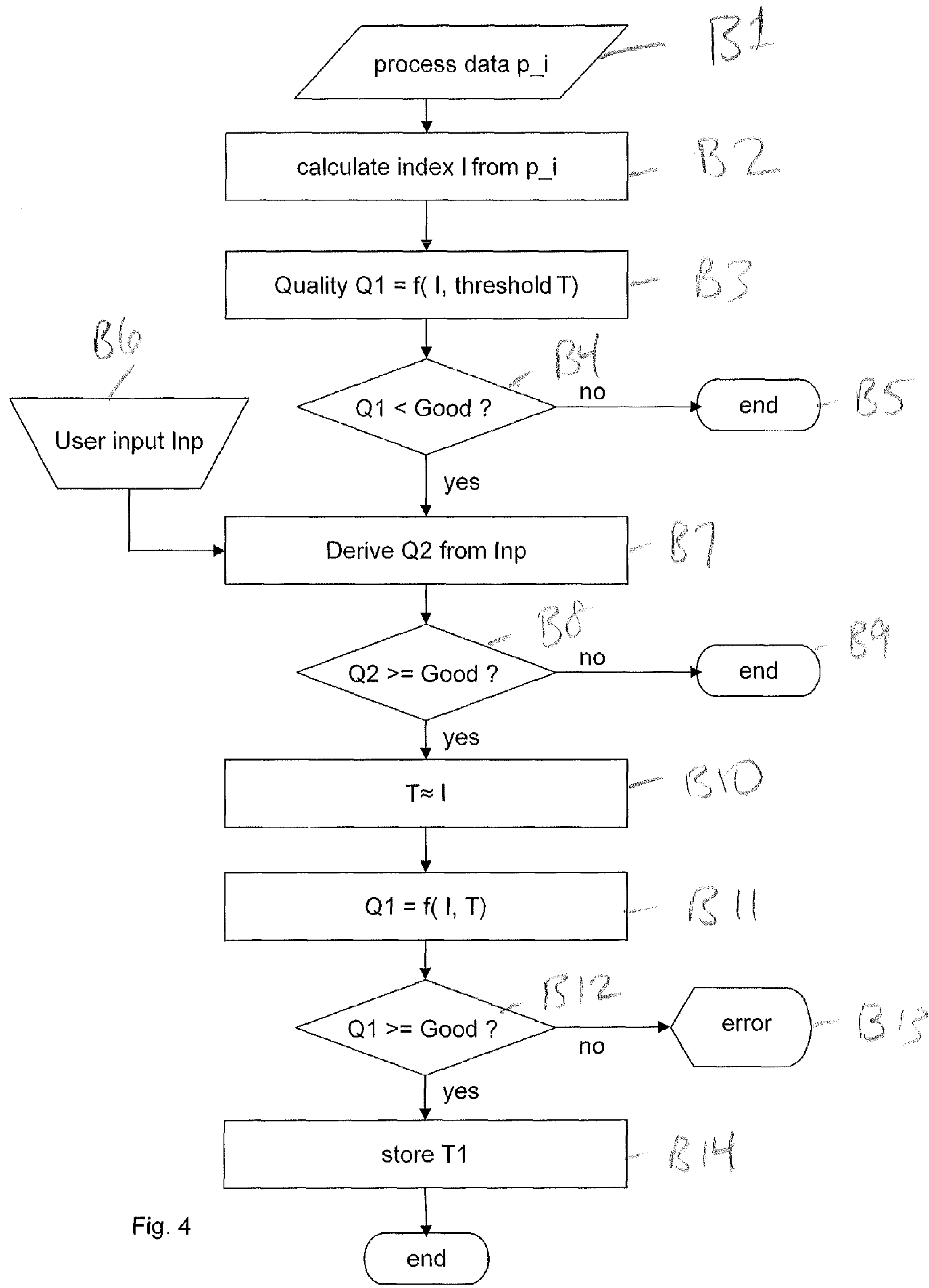
FIG. 4 illustrates a flow chart of a second monitoring process according to an exemplary embodiment of the disclosure.

FIG. 4 illustrates a flow chart of a second monitoring process according to an exemplary embodiment of the disclosure. The monitoring process of FIG. 4 differs from the exemplary embodiment of FIG. 3 in that the second quality Q2 is not derived from second process data but instead from a user input Inp (B7). The user input Inp (B6) could be an explicit category for the second quality Q2, e.g., the user could for example click on one of four buttons defining the control performance as "Excellent", "Good", "Fair" or "Poor". Alternatively, the user could request an adjustment of threshold values by clicking on a button which states "Take this data batch as reference", thereby implicitly stating that the control performance is regarded to be excellent.

Figure 5A:
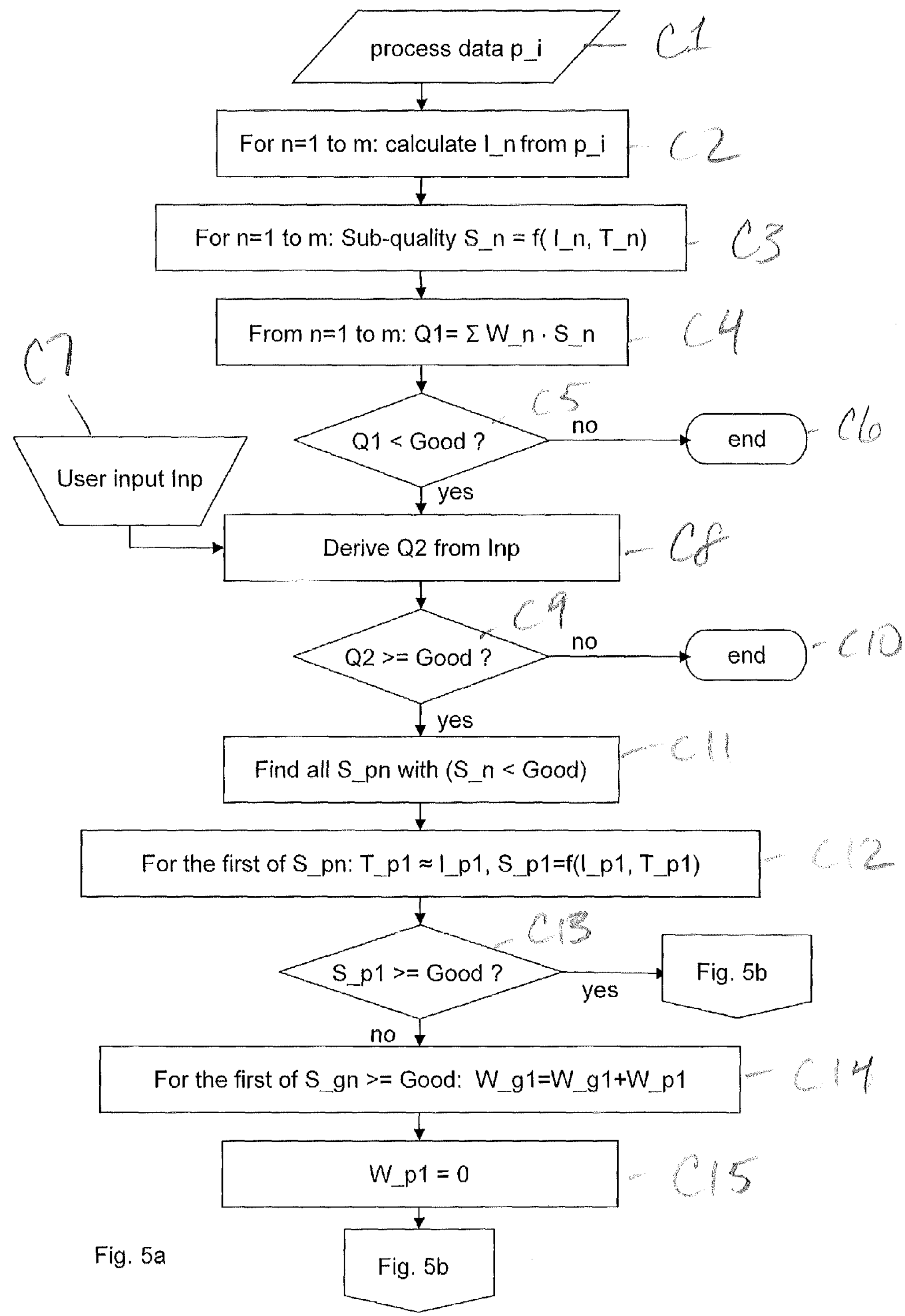
FIGS. 5*a,b* illustrates a flow chart of a third monitoring process according to an exemplary embodiment of the disclosure.
Figure 5B:
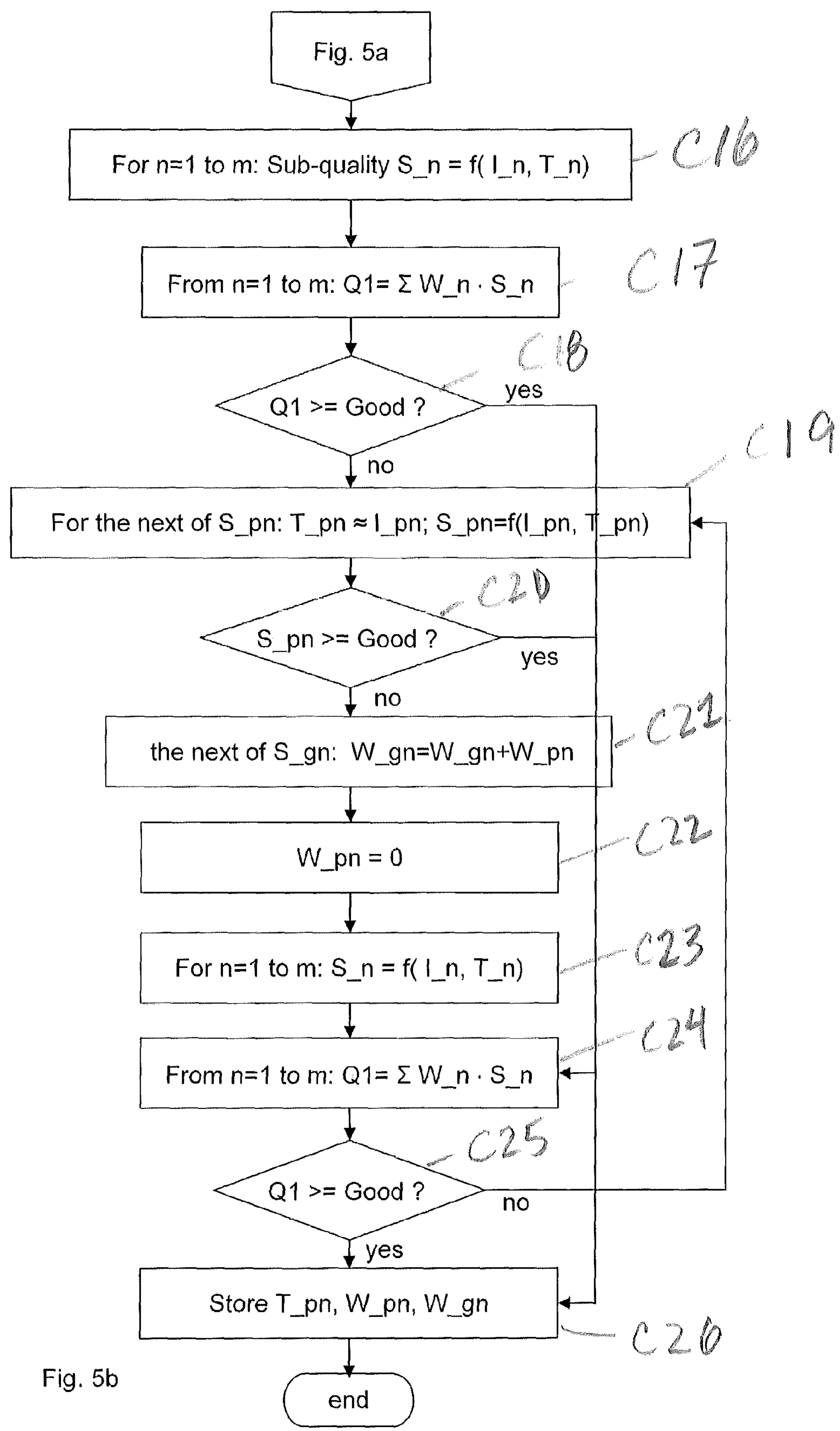

FIGS. 5*a,b* illustrates a flow chart of a third monitoring process according to an exemplary embodiment of the disclosure. As shown in FIGS. 5*a* and 5*b*, a number i of first process data or simply process data p_i of a control loop of the industrial plant, a number m of performance indices I_n are calculated (C1, C2, C3). In the first and second monitoring processes explained above, two performance indices would be calculated from the process data of a controlled process variable, which are the number of crossings of the set point and the quadratic sum of the control error. Accordingly, m would be set to 2.

In the next step (C4), for each of the performance indices I_n a so called sub-quality S_n is determined as a function of the respective performance index I_n and a corresponding threshold value T_n. Afterwards, each of the sub-qualities S_n is multiplied by a corresponding weight W_n and the sum of all m weighted sub-qualities is calculated. This sum stands for the first quality Q1.

Again, if the first quality Q1 is less than good (C5, C6), a second quality Q2 is determined, in this example from a user input Inp (C7). If the second quality Q2 is better than good (C9, C11), all sub-qualities S_poor are searched for which have a value less than good, e.g., which are responsible for the non-correct low value of the first quality Q1.

In the next steps, the threshold value T_p1 for a first of these sub-qualities S_poor is set to approximately the value of the corresponding performance index I_p1 and an updated value for the corresponding sub-quality S_p1 is calculated (C12).

If the updated value S_p1 is still less than good (C13, C14), the corresponding weight W_p1 is sufficiently reduced or set to zero, in order to suppress this erroneous sub-quality S_p1, which could not be corrected even though the threshold value T_p1 was corrected (C15). But before this is done and since the sum of all weights needs to be the same as before, in order to keep the comparability of the results of the control performance monitoring, the weight W of one of the sub-qualities which is good or better is increased by the amount corresponding to the reduction of the weight W_p1.

If the updated value S_p1 is better than good or after the weight W_p1 was reduced, the same next steps are performed, which are shown in FIG. 5*b*.

After the adjustment of the threshold value T_p1 and/or the reduction of weight W_p1 (C16), an updated value for the first quality Q1 is calculated, which indicated here by a repeating of the steps of calculating all m sub-qualities and of summing up the weighted sub-qualities (C17).

If the first quality Q1 now reflects the overall good or better control performance, the method ends successfully after having stored the adjusted threshold values and weights, which are in this case the threshold value T_p1 and/or the weights W_p1 and W_g1 (C26).

Otherwise, the above described steps are performed again for the next sub-quality S_pn having a value which is less than good, until the updated first quality Q1 is good or better (C19-C25).

It should be understood that in the end, all adjusted and amended threshold values and weights are stored permanently in order to be available for the next time the control performance is monitored. As described above, these values can be stored together with a new sub-type of control loop, which means that further configuration data and parameters belonging to the main type of control loop and needed for control performance monitoring may be stored together with them as well.

Figure 6:
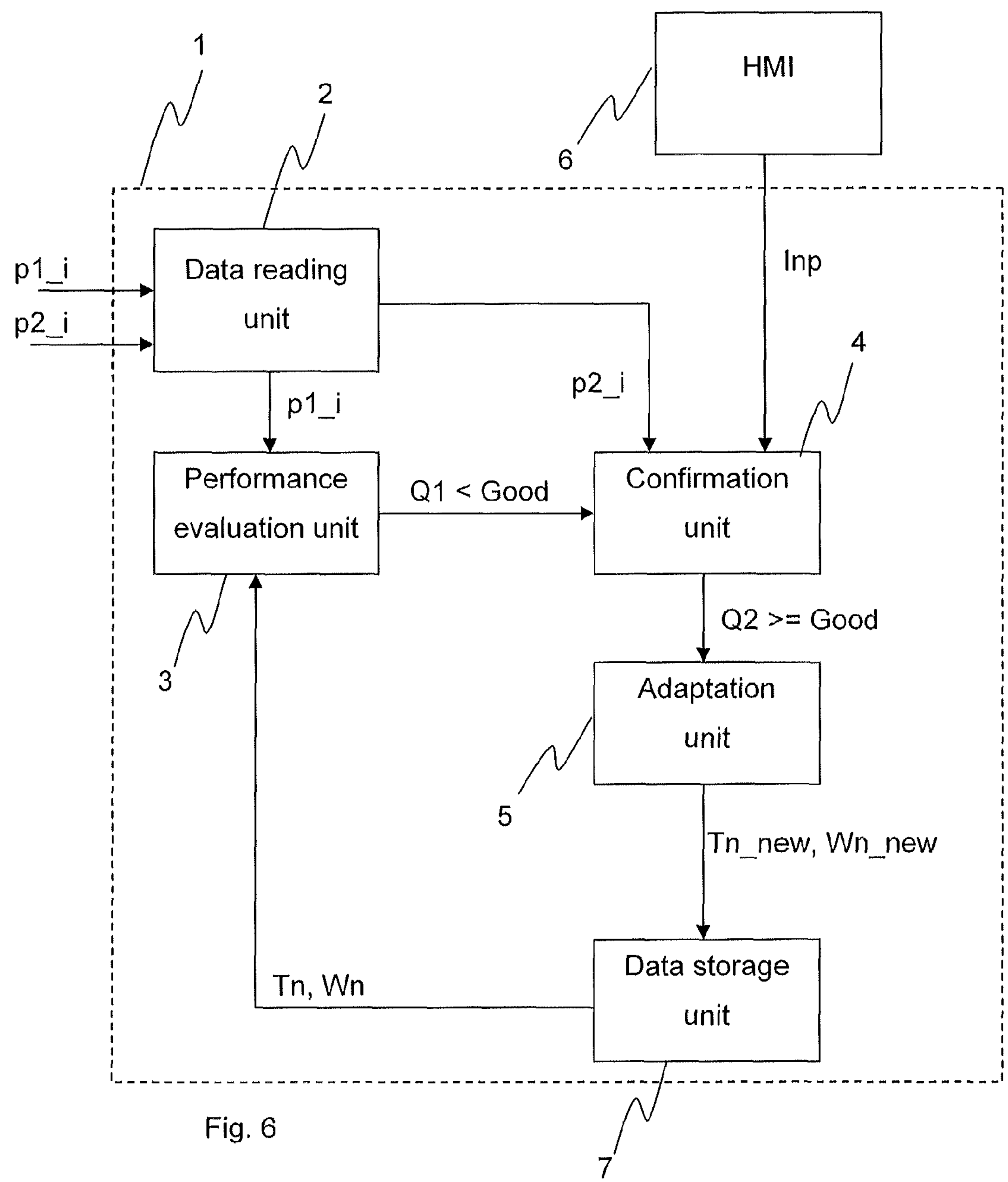
FIG. 6 illustrates a block diagram of an arrangement to perform the monitoring process of FIGS. 3-5 according to an exemplary embodiment of the disclosure.

FIG. 6 illustrates a block diagram of an arrangement to perform the monitoring process of FIGS. 3-5 according to an exemplary embodiment of the disclosure. As shown in FIG. 6, an arrangement 1 for performing the above described methods is shown. The arrangement 1 for configuring a system for monitoring the performance of a control loop of an industrial plant includes a data reading unit 2 which is adapted (e.g., configured) for reading in first and second process data, p1_*i* and p2_*i,* derived from measurements of at least one sensor inside the control loop during a particular control situation. The arrangement includes further a performance evaluation unit 3 adapted for calculating from the first process data p1_*i* one or more performance indices In indicating the behaviour of the control loop. The performance evaluation unit 3 is further adapted for determining a first quality Q1 of the control performance, either depending on the difference between the one performance index and a corresponding threshold value or by summing up weighted sub-qualities which the performance evaluation unit 3 calculates from the difference between each the performance indices In and a corresponding threshold value Tn.

A further element of the arrangement 1 is a confirmation unit 4 which is adapted (e.g., configured) for determining a second quality Q2 of the control performance, in case that the first quality Q1 of the control performance is determined to be less than good, where the confirmation unit 4 in this example determines the second quality Q2 by processing an input from a user. The input is received by a human machine interface 6 (HMI), for example a touch screen or keyboard, which transmits a corresponding input signal Inp to the confirmation unit 4. Even further components of the arrangement 1 are an adaptation unit 5 and a data storage unit 7, where the adaptation unit 5 is adapted for adjusting the one or more threshold values Tn to have a value close to the corresponding performance index In, thereby generating one or more new threshold values Tn_new, in case that the second quality Q2 of the control performance is determined to be good or better. The adaptation unit 5 is also adapted for reducing one or more weights of sub-qualities which were determined to be less than good, for example, setting them to zero, and for increasing the value of a corresponding number of weights of sub-qualities which were determined to be good or better, so that the sum of all weights remains the same. As a result, the adaption unit 5 generates updated values Wn_new for the one or more weights. The data storage unit is adapted for delivering stored values for the threshold values Tn and weights Wn to the performance evaluation unit 3 and for permanently storing the one or more adjusted threshold values Tn_new and the one or more changed weights Wn_new.

It should be understood that the various units in the arrangement of FIG. 6 can include one or more processors having program code stored or encoded therein for executing the exemplary process steps illustrated in FIGS. 3-5*b*. The one or more processors can be any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processors can be located in a single device or remotely such that communication over a network using a suitable network protocol is provided. As already discussed, the one or more processors can be configured to include and perform features of the exemplary embodiments of the present disclosure through program code encoded or recorded thereon, or stored in a non-volatile memory device, such as Read-Only Memory (ROM), erasable programmable read-only memory (EPROM), or other suitable memory device or circuit as desired. In an exemplary embodiment, the program code can be recorded on a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor for execution as desired, when the computer readable medium is placed in communicable contact with the processor.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for configuring a system for monitoring the performance of a control loop of an industrial plant, comprising:

reading in first process data derived from measurements of at least one sensor inside the control loop during a particular control situation;

calculating from the first process data at least one performance index indicating the behaviour of the control loop;

performing a first determination by determining a first quality of the control performance depending on a difference between the at least one performance index and a corresponding threshold value, wherein if under the first determination the first quality of the control performance is determined to be less than good, a second quality of the control performance is determined by analyzing second process data derived in a different way from measurements of the at least one sensor or of at least one further sensor inside the control loop during the particular control situation, or by processing an input from a user, the input indicating the second quality, wherein if the second quality is determined to be less than good, the first quality is identified as a correct value, wherein if the second quality of the control performance is determined to be good or better than good the at least one threshold value is adjusted to have a value close to the at least one performance index, and a second determination of the first quality is performed with an expectation that the first quality has a same level as the second quality, wherein if under the second determination, the first quality is determined to be good or better than good, as expected, the at least one threshold value is stored for a next control performance diagnosis, and wherein if under the second determination the first quality is still determined to be less than good, an error message is generated.

2. The method according to claim 1, where the at least one threshold value is adjusted to have a value which differs by a predefined percentage from the at least one performance index, wherein the predefined percentage has a first value for conditions where the second quality is good and at least one further value if the second quality is better than good.

3. The method according to claim 1, wherein for each of the at least one performance indices and their corresponding threshold values a corresponding sub-quality is determined and the first quality of the control performance is determined as a sum of weighted sub-qualities, and if under the first determination the first quality of the control performance is determined to be less than good and the second quality is determined to be good or better than good, the weight of at least one of said sub-qualities which were determined to be less than good is reduced and the reduced weight is stored.

4. The method according to claim 3, wherein the weight of at least one said sub-qualities determined to be less than good is reduced without adjusting the threshold value.

5. The method according to claim 3, where after adjusting the at least one threshold value belonging to at least one of the sub-qualities determined to be less than good, the sub-quality is determined again if the sub-quality is still less than good, and the weight of this sub-quality is reduced.

6. The method according to claim 3, wherein the weight of the at least one sub-quality is reduced after having evaluated that the at least one sub-quality is not applicable to the control situation.

7. The method according to claim 3, wherein the weight of the at least one sub-quality is reduced until it is set to zero.

8. The method according to claim 3, wherein the weight of at least one of the sub-qualities which were determined to be good or better than good is increased so that an overall sum of all weights remains unchanged.

9. The method according to claim 3, wherein the first quality of the control performance is determined as a scaled sum of weighted sub-qualities, and wherein the scaling factor is proportional to an overall sum of all weights.

10. The method according to claim 3, wherein the at least one threshold value is adjusted to have a value close to the at least one performance index and/or where the weight of more sub-qualities is modified so that the resulting first quality of the control performance is determined to be good or better than good, respectively.

11. The method according to claim 1, wherein the at least one adjusted threshold value and/or the at least one modified weight of the sub-qualities is stored together with other configuration data of the control loop.

12. The method according to claim 2, wherein for each of the at least one performance indices and their corresponding threshold values a corresponding sub-quality is determined and the first quality of the control performance is determined as a sum of weighted sub-qualities, and if under the first determination the first quality of the control performance is determined to be less than good and the second quality is determined to be good or better than good, the weight of at least one of said sub-qualities which were determined to be less than good is reduced and the reduced weight is stored.

13. The method according to claim 12, wherein the weight of at least one said sub-qualities determined to be less than good is reduced without adjusting the threshold value.

14. The method according to claim 12, where after adjusting the at least one threshold value belonging to at least one of the sub-qualities determined to be less than good, the sub-quality is determined again if the sub-quality is still less than good, and the weight of this sub-quality is reduced.

15. The method according to claim 12, wherein the weight of the at least one sub-quality is reduced after having evaluated that the at least one sub-quality is not applicable to an associated control situation.

16. The method according to claim 12, wherein the weight of the at least one sub-quality is reduced until it is set to zero.

17. The method according to claim 12, wherein the weight of at least one of the sub-qualities which were determined to be good or better than good is increased so that an overall sum of all weights remains unchanged.

18. The method according to claim 12, where the first quality of the control performance is determined as a scaled sum of weighted sub-qualities, wherein the scaling factor is proportional to an overall sum of all weights.

19. The method according to claim 12, wherein the at least one threshold value is adjusted to have a value close to the at least one performance index and/or where the weight of more sub-qualities is modified so that the resulting first quality of the control performance is determined to be good or better than good, respectively.

20. An arrangement for configuring a system for monitoring the performance of a control loop of an industrial plant, comprising:

a data reading unit configured to read in first process data derived from measurements of at least one sensor inside the control loop during a control situation;

a performance evaluation unit configured to calculate from the first process data a corresponding at least one performance index indicating the behaviour of the control loop and perform a first determination of a first quality of a control performance depending on a difference between the at least one performance index and a corresponding threshold value;

a confirmation unit configured to determine a second quality of the control performance, if the first quality of the control performance is determined to be less than good, by calculating the second quality from an analysis of second process data derived from measurements of at least one further sensor inside the control loop during the control situation, or by processing an input from a user of the system which indicates the second quality;

an adaptation unit configured to confirm and correct the first quality if the second quality is less than good, or adjust the at least one threshold value to have a value close to the at least one performance index, if the second quality of the control performance is determined to be good or better than good, perform a second determination of the first quality with an expectation that under the second determination the first quality has a same level as the second quality, if under the second determination the first quality is determined to be good or better than good, as expected, the at least one threshold value is stored for a next control performance diagnosis, and if under the second determination the first quality is still less than good, generate an error message; and a data storage unit configured to store the at least one adjusted threshold value if under the second determination the first quality is determined to be good or better than good.

* * * * *